US005888283A

United States Patent [19]

Mehta et al.

[11] Patent Number: 5,888,283

[45] **Date of Patent: *Mar. 30, 1999**

[54] HIGH SOLIDS DIRECT THERMAL INK COMPOSITION AND METHOD OF MAKING AND USING SAME

[75] Inventors: Rajendra Mehta, Centerville; Rick L. Shields; Mark Dotson, both of Dayton, all of Ohio

[73] Assignee: The Standard Register Company, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 744,100

[22] Filed: Nov. 5, 1996

[51] Int. Cl.[6] .................... C09D 11/00

[52] U.S. Cl. .................... 106/31.16; 106/31.18; 427/288

[58] Field of Search .................... 106/31.16, 31.18; 427/288

[56] References Cited

U.S. PATENT DOCUMENTS

| | | | |
|---|---|---|---|
| 4,180,405 | 12/1979 | Lawton . | |
| 4,236,732 | 12/1980 | Murakami et al. | 282/27.5 |
| 4,639,270 | 1/1987 | Ando et al. | 106/31.16 |
| 4,921,535 | 5/1990 | Nachbur et al. . | |
| 5,013,708 | 5/1991 | Nishiyama | 106/31.16 |
| 5,231,117 | 7/1993 | Seitz . | |
| 5,484,758 | 1/1996 | Wald . | |
| 5,524,934 | 6/1996 | Schwan et al. . | |

FOREIGN PATENT DOCUMENTS

| | | |
|---|---|---|
| 297045 | 12/1988 | European Pat. Off. . |
| 443805 | 8/1991 | European Pat. Off. . |
| 465402 | 1/1992 | European Pat. Off. . |
| 54085041 | 12/1977 | Japan . |

OTHER PUBLICATIONS

T. Usami and A. Shimomura, "Transparent Thermal Film", *Journal of Imaging Technology*, Vol. 16, No. 6, Dec. 1990, pp. 234–237.

*Primary Examiner*—Deborah Jones
*Attorney, Agent, or Firm*—Killworth, Gottman, Hagan & Schaeff, L.L.P.

[57] ABSTRACT

A direct thermal ink composition is provided which is formed from an aqueous dispersion of an initially colorless color former and an initially colorless color developer in particulate form. The direct thermal ink composition also includes a sensitizer, where the particles of the sensitizer at least partially surround the particles of the color developer, which prevents premature color development of the ink. The thermal ink preferably has a solids content of between about 40 to 60% by weight, and is substantially free of pigments and fillers.

25 Claims, 3 Drawing Sheets

HIGH SOLIDS DIRECT THERMAL INK COMPOSITION AND METHOD OF MAKING AND USING SAME

BACKGROUND OF THE INVENTION

The present invention relates to a direct thermal ink for use in thermal printing applications. More particularly, the present invention relates to a direct thermal ink having a high solids content, an improved process of manufacturing the thermal ink, and process for using the ink.

In the manufacture of direct thermal paper, typically, a substrate such as paper is coated over its entire surface with an aqueous dispersion comprising initially colorless color formers and color developers along with suitable binders which, when heated, combine to form a visible color. When such a coated substrate passes under the print head of a thermal printer, the areas which are activated by the heated print elements of the printer form colored images on the surface of the substrate.

Among the well-known color formers used in direct thermal coating formulations are colorless chromogenic dye precursors such as leuco dyes, triphenyl methanes, diphenyl methanes, xanthene compounds, thiazene compounds, and spiropyran compounds. Well known color developers include phenolic resins such as acetylated phenolic resins, salicylic acid modified phenolic resins, and novolac type phenolic resins.

The color formers and color developers are typically present in the form of finely-divided solid particles which are dispersed in a binder. Thermal coating formulations also typically contain a sensitizer, which is a low melting point solid which, when subjected to heat, melts and becomes a solvent for the color forming and color developing reactants. Other commonly-used ingredients include fillers or pigments, lubricants, whiteners, image-stabilizers and wetting aids.

However, thermal coating formulations currently in use suffer from a number of drawbacks. For example, the sensitizer contained in the formulation is often not uniformly dispersed such that the color developer and color former are in direct contact, which leads to premature color development of the coating when stored prior to use or after application on a substrate. Further, when the sensitizer is not uniformly dispersed, a higher temperature is required to activate unevenly coated areas of the substrate, which creates a grainy or parchment appearance to any image which is formed.

Another disadvantage of thermal coating formulations is that they are coated as a relatively low solids content aqueous solution (i.e., less than about 30% solids by weight) onto a substrate, which requires that the coated substrate be passed through a dryer. Such coating and drying steps require the use of complex and expensive equipment, and also require a large input of energy. For example, conventional thermal papers are typically coated on large paper machines of up to 100 ft. long using Meyer rod, air knife, or blade coating techniques and then passed through large, low temperature air impinged dryers (up to 100 ft. long) to dry the coatings. Such coating formulations cannot be applied by processes which employ smaller printing and drying equipment, such as, for example, a flexographic printing process, because of their high water content, low solids content and low viscosity.

It is possible to include pigments and/or fillers in the ink to increase the solids content of the coatings and decrease drying time and expense. However, such coating formulations are still unsuitable for use in flexographic printing operations because such pigments and fillers tend to fill up anilox rolls and interfere with print quality.

Accordingly, there remains a need in the art for a direct thermal ink formulation which does not develop color prematurely, which has improved shelf life, which has a high solids content, and which may be easily manufactured and applied to substrates utilizing a variety of processes.

SUMMARY OF THE INVENTION

The present invention meets that need by providing a direct thermal ink composition having a high solids content which can be printed using conventional printing processes and which eliminates the need for expensive drying processes and equipment. In a preferred form, the ink includes a sensitizer in particulate form, which sensitizer particles partially surround the color developer particles and help provide a barrier between the color developer and/or color former in the composition, preventing premature color development and improving shelf life. In addition, the ink is substantially free of pigments and fillers. The ink can be manufactured to form numerous different colors, and may be printed using conventional flexographic, or gravure printing techniques.

According to one aspect of the present invention, a direct thermal ink composition is provided comprising an aqueous dispersion of an initially colorless color former and an initially colorless color developer which combine to form color upon the application of heat. By "color former", we mean a chromogenic material which acts as an electron acceptor (Lewis base). By "color developer", we mean a material which acts as an electron donor (Lewis acid) and which reacts with the chromogenic color former.

The thermal ink has a solids content of at least 40% by weight, preferably from between about 40 to 60% by weight, and more preferably from between about 45 to 60% by weight.

Preferably, the color former and color developer are in particulate form in the dispersion, and have average particle sizes of less than about 10$\mu$, and preferably less than about 3$\mu$. The color developer and color former may comprise any of the known compounds heretofore used for these purposes. In one embodiment, the color developer comprises bis-(3-allyl-4-hydroxy phenyl) sulfone and the color former comprises an initially colorless leuco dye.

In a preferred embodiment of the invention, the direct thermal ink further includes a sensitizer to facilitate color formation in the ink when heated. Preferably, the sensitizer is also in particulate form, and the particles of the sensitizer at least partially surround the particles of the color developer. By "at least partially surround", we mean that particles of the sensitizer contact particles of color developer and form a physical barrier between particles of the color developer and color former. In one embodiment, the sensitizer comprises p-benzyl biphenyl.

In a further embodiment of the invention, the color former, color developer, and sensitizer are present in particulate form, with particles of the sensitizer at least partially surrounding either the particles of the color former or the particles of the color developer.

The direct thermal ink composition also preferably further includes one or more binders and a surfactant to improve the rheological properties of the ink. In a preferred form, the aqueous dispersion of the ink preferably comprises from about 10 to 30% by weight of the color developer, from about 6 to 30% by weight of the color former, from about 8 to 20% by weight of the sensitizer, from about 5 to 60% by weight of the binder, from about 0.15 to 0.25% by weight of the surfactant, and the remainder water. In this embodiment, the binder preferably comprises an acrylic binder. The aqueous dispersion may further include one or more water soluble binders such as, for example, starch or poly(vinyl alcohol). The acrylic binder preferably comprises from about 5 to 15% by weight of the aqueous dispersion, while the water soluble binder may comprise from about 30 to 45% by weight of the composition.

The present invention also provides a method of making a printable direct thermal ink comprising the steps of providing a first aqueous dispersion comprising a color developer and a sensitizer and grinding the color developer and sensitizer to provide a particulate dispersion having an average particle size of less than about 10$\mu$, and preferably less than about 3$\mu$. The grinding step is effective to cause the sensitizer particles to at least partially surround the color developer particles. A second aqueous dispersion of a color former is also provided, where the color former is ground to provide a particulate dispersion having an average particle size of less than about 10$\mu$, and preferably less than about 3$\mu$. The first and second aqueous dispersions are then combined to form the thermal ink. The first and second aqueous dispersions may also include one or more acrylic binders and a surfactant as described above. A water soluble binder is also preferably included in the thermal ink to provide the ink with a viscosity of from about 150 to 250 cps.

Preferably, the step of grinding the first aqueous dispersion is carried out at a temperature above the softening point of the sensitizer such that the sensitizer particles soften and then recrystallize and at least partially surround the color developer particles. This step is preferably carried out at a temperature of between about 70° F. to 100° F. (21° C. to 38° C.). However, the temperature may vary depending on the respective softening and melting points of the chosen sensitizer and color developer.

Because the sensitizer at least partially surrounds the color developer particles, it acts as a physical barrier between the color developer and color former, which aids in preventing premature color development of the ink either when stored, or during or after printing onto the substrate to which it is applied.

The thermal ink of the present invention may be applied to a substrate by a process comprising the steps of providing a substrate having first and second surfaces, and applying a thermal ink to at least a portion of one of the first or second surfaces of the substrate. The substrate is preferably selected from the group consisting of paper, synthetic paper, and polymeric sheets and films.

In one embodiment, the thermal ink is applied in a flexographic printing process. The thermal ink may also be applied by overprinting a series of half-tone images onto the substrate using a flexographic or gravure printing process.

Preferably, the thermal ink is applied to the substrate so as to provide a dry coating weight of between about 0.50 and 2.50 lbs/17"×22"×500 sheet ream. The direct thermal ink may be printed into any desired pattern on the substrate, and dried with minimum effort using dryers such as those conventionally used in a flexographic press. Once applied to a substrate, the ink does not develop color until activated by heat, such as by passage through a direct thermal printer.

Accordingly, it is a feature of the invention to provide a direct thermal ink composition which has a high solids content, which does not color prematurely, and which may be applied to a substrate using a variety of printing techniques. It is a further feature of the invention to provide a method of making such a direct thermal ink composition in which the sensitizer and color developer or color former are ground together such that the sensitizer at least partially surrounds the color developer and/or color former to prevent premature color formation. These, and other features and advantages of the present invention will become apparent from the following detailed description, the accompanying drawings, and the appended claims.

DETAILED DESCRIPTION OF THE PREFERRED EMBODIMENT

The direct thermal ink composition and method of the present invention provides many advantages over prior direct thermal coating formulations. By grinding the color developer and sensitizer and/or color former and sensitizer particles together, the sensitizer particles at least partially surround the color developer and/or color former particles and provide improved resistance to premature color development when the color developer and color former are dispersed together, to form the ink. This method of grinding these components together rather than separately, also improves the particle size and distribution uniformity of the color developer and color former in the inks and provides a longer shelf life for the pre-mixed inks in storage. This method also results in a longer fountain life for the inks during printing, and permits the use of a higher solids content ink than previous methods and without the use of fillers or pigments.

Figure 1:
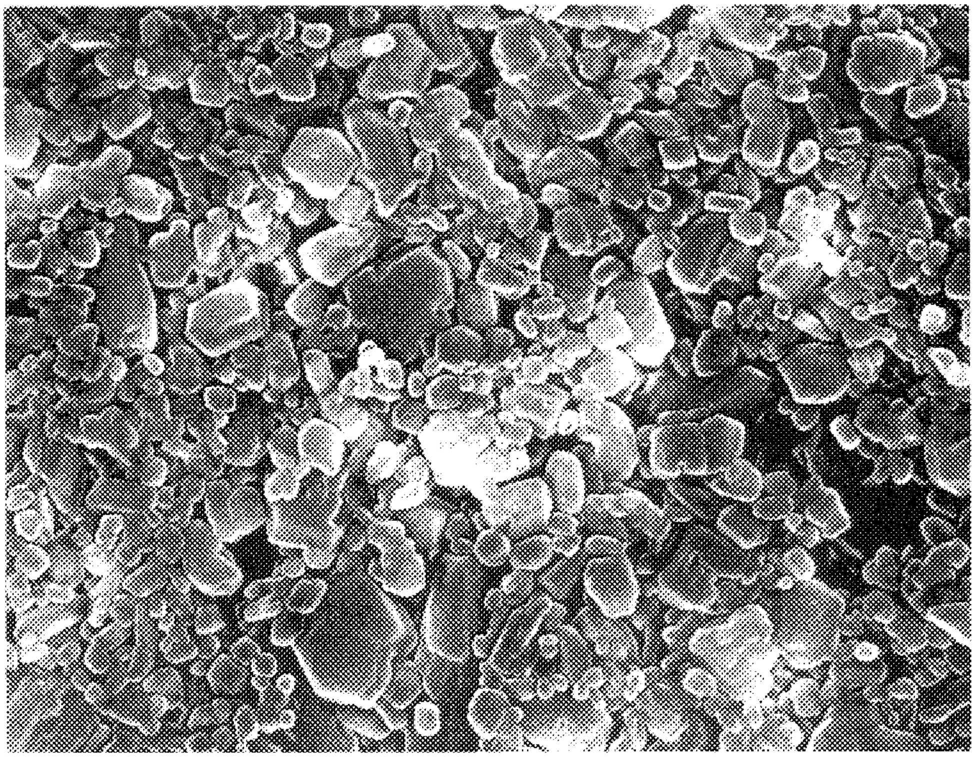
FIG. 1 is a scanning electron micrograph showing ground sensitizer particles.
Figure 2:
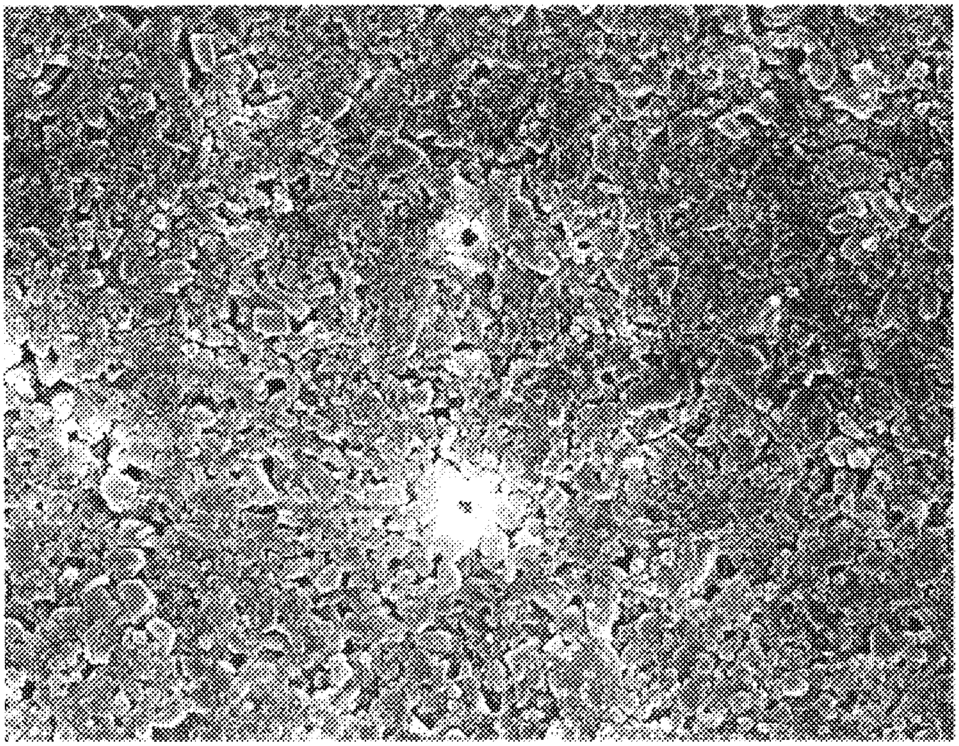
FIG. 2 is a scanning electron micrograph showing ground color developer particles.
Figure 3:
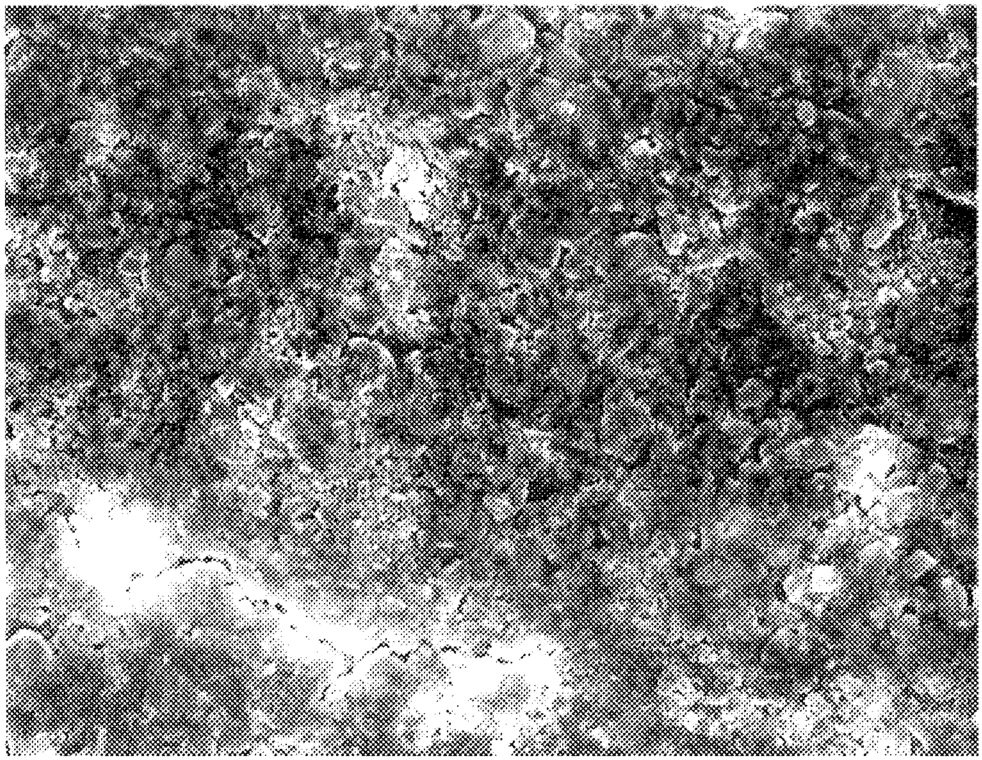
FIG. 3 is a scanning electron micrograph showing color developer particles partially surrounded by sensitizer particles after being ground simultaneously in accordance with the method of the present invention.

In previous methods, the sensitizer was ground separately from the color developer and color former. FIGS. 1 and 2 are scanning electron micrographs taken using a JEOL JSM-840 scanning electron microscope. The micrographs illustrate the sensitizer and color developer particles, respectively, which have been ground separately. In the present invention, however, the color developer and sensitizer and/or the color former and sensitizer are ground together in a step which causes the sensitizer to at least partially surround the color developer and/or color former particles forming what may be characterized as an uneven coating. FIG. 3 illustrates the uneven coating which takes place after color developer particles have been ground with a sensitizer. This uneven coating may be described as the formation of clusters of sensitizer particles around color developer and/or color former particles. The uneven coating is not believed to result from a chemical reaction or by complete encapsulation of the sensitizer particles around the color developer and/or color former particles, but rather appears to occur as a result of the unexpected recrystallization of sensitizer particles around the color developer and/or color former particles which occurs when the sensitizer softens during the grinding step. We have found that this uneven coating of the color developer and/or color former particles results in improved color uniformity and intensity of the colors formed on a substrate after heat activation of the printed ink.

Further, because the direct thermal ink of the present has a high solids content, a low viscosity, and is substantially free of pigments and fillers, it may be easily applied to a substrate using conventional flexographic or gravure printing techniques while achieving high print quality. The inks may be applied to a variety of substrates including paper, polymeric films or sheets, or synthetic paper. Suitable polymers include polyester, polyethylene, polypropylene, polyvinyl and polystyrene in sheet or film form.

Suitable color formers for use in the present invention include colorless chromogenic dye precursors known in the art such as diaryl methanes including 4,4-bis (dimethylaminobenzhydroxybenzyl) ether, N-halophenyl, leuco auramine, and N-2,4,5-trichlorophenyl leuco auramine; fluorans including 2-dibenzylamino-6-diethylaminofluoran, 2-anilino-6-diethylaminofluoran, 3-methyl-2-anilino-6-diethylaminofluoran, 2-anilino-3-methyl-6-(ethyl-isopentylamino) fluoran, 2-anilino-3-methyl-6-dibutyl aminofluoran, 2-chloro-3-methyl-6-diethylaminofluoran, 3,6-dimethoxyfluoran, and 7,7'-bis(3-diethylaminofluoran); spiropyrans including 3-methylspirodinaphtho-pyran, 3-ethylspirodinaphthopyran, 3,3'-dichloro spirodinaphthopyran, 3-benzyl spironaphthopyran, and 3-methylnaphtho-(3-methoxybenzo) spiropyran; azaphthalides including 3-(2-ethoxy-4-diethylaminophenyl)-3-(1-octyl-2-methylindol-3-yl)-4-azaphthalide, and 3-(2-ethoxy-4-diethylaminophenyl)-3-(1-ethyl-2-methylindol-3-yl)-4-azaphthalide; indolylphthalides including 3-(p-dimethylamino phenyl)-3-(1,2-dimethylindol-3-yl)phthalide and 3-(p-dimethylaminophenyl)-3-(2-methylindol-3-yl) phthalide; trianyl methanes; and styryl quinoline. Other suitable color formers are described in U.S. Pat. No. 4,180,405, incorporated herein by reference. Preferred color forming dyes for use in the present invention include CIBA IG orange, CIBA I6B red, and CIBA I2G blue or CVL-H-Blue, all available from Ciba-Geigy Corporation; and Yamada Y721 yellow and Yamada 305 black, available from Nagase America.

A preferred color developer for use in the present invention is bis-(3-allyl-4-hydroxy phenyl) sulfone, which is commercially available from Nagase America under the designation TGSA. Other suitable color developers include 2,4 dihydroxy diphenyl sulfone, p-hydroxybenzylphenol, 4,4'-disulfonyl phenol, 3-benzyl salicylic acid, 3,5-ditertbutylsalicylic acid, 4-hydroxyphenyl-4-isopropoxyphenylsulfone, 4,4'-thiodiphenol phenol-formaldehyde novolac resin, alphanaphthol, bisphenol A, bisphenol sulfone, benzyl 4-hydroxybenzoate, 3,5-dimethyl-4-hydroxybenzoic acid, 3-isopropylsalicylic acid, 4,4'-isopropylidene diphenol, and 3,3'-dimethyl-4-4'-thiodiphenol. The preferred color developers for use have melting or softening points in the range of from about 40° C. to 250° C.

Suitable sensitizers for use in the ink composition include diphenoxyethane, aryl or alkyl-substituted biphenyls such as p-benzyl biphenyl, or toluidide phenyl hydroxynaphthoates and aromatic diesters such as dimethyl or dibenzyl terephthalate and dibenzyl oxalate. These materials may be used alone, or they may be combined with waxes or fatty acids. A preferred sensitizer for use is p-benzyl biphenyl. The sensitizer preferably has a softening point of between about 80° F. to 85° F. (27° C. to 29° C.) and a melting point of between about 140° F. to 150° F. (60° C. to 65° C.). When the sensitizer is heated to its melting point (such as by the printhead in a direct thermal printer), it melts and lowers the melting point of adjacent color developer and color former particles, causing them to dissolve, react, and form a desired color.

An acrylic and/or water soluble binder may also be included in the thermal ink composition to improve the rheological properties of the ink for better printability and to promote good adhesion of the ink to a substrate surface. A preferred acrylic binder for use in the present invention is commercially available from B.F. Goodrich under the designation Carboset 1915. The acrylic binder preferably has a solids content of between about 20 to 45% by weight and a pH of between about 6 and 8.5. Other suitable acrylic binders include styrene-acrylic binders. Suitable water soluble binders include polyvinyl alcohol (completely hydrolyzed or partially hydrolyzed) and grafted starch. The water soluble binder aids in producing a low viscosity ink composition.

The ink composition also preferably includes a surfactant to aid in proper wetting of the ink. Preferred surfactants for use in the present invention include SURFYNOL GA, available from Air Products and Chemicals, Inc. and FOAM-X 1435, commercially available from Goldschmidt Chemical Company.

In the preferred method of making the ink of the present invention, the color developer, sensitizer, binder, and surfactant are mixed with water to form a first aqueous dispersion which is passed through a grinding mill. A preferred mill for use in making the ink of the present invention is a horizontal mill (available from Ross Mixing) containing 1 mm diameter ceramic or zirconium balls as media, and which is agitated by rotating discs at approximately 1000 rpm. This method is preferred over previous methods which utilized an attritor or vertical ball mill containing stainless steel balls as the grinding media. It has been discovered that extended contact of the components of the ink with such stainless steel balls causes chromium to leach into and contaminate the ink. By using a horizontal mill with ceramic or zirconium media which rotates at a faster speed, the grinding time is reduced, and the chances of chromium contamination are substantially reduced.

During the grinding step, the temperature should be maintained at a temperature of between about 75° F. and 100° F. (24° C. and 38° C.). During this step, the color developer particles are preferably ground from an initial size of about 100$\mu$ to less than about 3$\mu$, and preferably between about 1.7$\mu$ and 2.5$\mu$. As the color developer particles are reduced in size, the particulate sensitizer, which has a typical softening point of between about 80° F. to 85° F. (27° C. to 29° C.), softens and then recrystallizes such that the particles at least partially surround the developer particles in an uneven coating as shown in FIG. 3.

A second aqueous dispersion is then prepared which preferably comprises the color former, acrylic binder, surfactant and water. The second aqueous dispersion is then passed through the grinding mill such that the color former particles are ground to a size of less than about 3$\mu$, and preferably between about 1.7$\mu$ and 2.5$\mu$.

It should be appreciated that while the preferred method of forming the ink is to grind the color developer and sensitizer, it is also possible to grind the color former and sensitizer together such that the sensitizer particles at least partially surround the color former particles.

After grinding the color developer and color former dispersions, the first and second aqueous dispersions are then combined by mixing or agitating in a container prior to printing. The resulting ink composition has a solids content of from about 50 to 60% by weight. It is important to maintain a solids content in this range as a solids content below 40% results in drying problems and paper distortion due to the high water content. If the solids content is above 60%, the composition will be too viscous and will be difficult to apply using printing equipment. A water soluble binder may be added to the combined aqueous dispersions, if desired, to adjust the final viscosity of the ink.

The resulting direct thermal ink composition may be applied to a substrate by any suitable coating or printing process including flexographic or gravure printing techniques. The coatings may be pattern printed in the form of spots, stripes, logos, bar codes, letters, numbers, words or other indicia. The coatings are preferably applied to achieve a dry coating weight of between about 0.50 and 2.50 lbs/17"×22"×500 sheet ream, and may be selectively printed or coated on the surface of stock papers during the manufacturing process.

It should be appreciated that while the ink described herein comprises first and second aqueous dispersions which are combined and applied to a substrate, it is also within the scope of the invention to apply the first and second dispersions separately. For example, an aqueous dispersion of the color former may be prepared as described above and applied separately by spot coating onto a substrate. An aqueous dispersion comprising the color developer and the sensitizer may be prepared as described above and then separately applied as a spot or full coat over the color former on the substrate.

In order that the invention may be more readily understood, reference is made to the following examples, which are intended to be illustrative of the invention, but are not intended to be limiting in scope.

EXAMPLE 1

The following materials were combined to form an aqueous dispersion:

| Ingredient | Weight % |
|---|---|
| Color Developer[1] | 29.0 |
| Sensitizer[2] | 21.8 |
| Acrylic Binder[3](24% solids) | 12.8 |
| Surfactant[4] | 0.2 |
| Water | 37.0 |

[1]TGSA from Nagase America
[2]p-benzyl biphenyl
[3]Carboset 1915 from B. F. Goodrich
[4]Foam-X 1435 from Goldschmidt Chemical Company The dispersion was then passed through a horizontal grinding mill (Ross Mixing) at a constant speed of between about 125 to 225 feet per minute while maintaining a temperature of between about 75° F. and 100° F. (24° C. and 38° C.). The color developer was ground to a particle size of between about 1.7μ and 2.5μ. As the developer particles were reduced in size, the sensitizer particles crystallized and partially surrounded the color developer particles in an uneven coating.

A second aqueous dispersion was prepared comprising the following materials:

| Ingredient | Weight % |
|---|---|
| Color Former[1] | 50.0 |
| Acrylic Binder[2](24% solids) | 12.5 |
| Surfactant[3] | 0.25 |
| Water | 37.25 |

[1]Yamada 305 Black from Nagase America
[2]Carboset 1915 from B. F. Goodrich
[3]Foam-X 1435 from Goldschmidt Chemical Company The first and second dispersions were then combined and printed onto a substrate to provide a dry coating weight of 0.50 to 2.50 lbs/17"×22"×500 sheet ream.

EXAMPLE 2

A thermal ink was prepared as described in Example 1 comprising the following dispersions:

Dispersion A

| Ingredient | Weight % |
|---|---|
| Color Former[1] | 50.0 |
| Acrylic Binder[2](24% solids) | 12.5 |
| Surfactant[3] | 0.25 |
| Water | 37.25 |

[1]Yamada 305 black from Nagase America
[2]Carboset 1915 from B. F. Goodrich
[3]Foam-X 1435 from Goldschmidt Chemical Company Dispersion B

| Ingredient | Weight % |
|---|---|
| Color Developer[1] | 29.18 |
| Sensitizer[2] | 20.82 |
| Acrylic Binder[3](24% solids) | 12.5 |
| Surfactant[4] | 0.25 |
| Water | 37.25 |

[1]TGSA from Nagase America
[2]p-benzyl phenol
[3]Carboset 1915 from B. F. Goodrich
[4]Foam-X 1435 from Goldschmidt Chemical Company The two dispersions were ground and then combined as described in Example 1. A water soluble binder was then added to form the following thermal ink composition:

| Ingredient | Weight % | Solids(%) |
|---|---|---|
| Color Former | 12.01 | 50 |
| Color Developer | 24.68 | 50 |
| Acrylic Binder | 6.03 | 24 |
| Sensitizer | 17.54 | 50 |
| Water Soluble binder | 39.51 | 32 |
| Surfactant | 0.23 | 37 |

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A direct thermal ink composition comprising:

an aqueous dispersion of an initially colorless color former and an initially colorless color developer which combine to form color upon the application of heat, and a sensitizer for said color former and color developer which has been ground together with said color developer, said thermal ink having a solids content of at least 40% by weight and being substantially free of pigments and fillers.

2. A direct thermal ink as claimed in claim 1 in which said ink has a solids content of from between about 40 to 60% by weight.

3. A direct thermal ink as claimed in claim 1 in which said ink has a solids content of from between about 45 to 60% by weight.

4. A direct thermal ink as claimed in claim 1 in which said color former and color developer have an average particle size of less than about 3$\mu$.

5. A direct thermal ink as claimed in claim 1 in which said sensitizer comprises p-benzyl biphenyl.

6. A direct thermal ink as claimed in claim 1 in which said color developer comprises bis-(3-allyl-4-hydroxy phenyl) sulfone.

7. A direct thermal ink as claimed in claim 1 in which said thermal ink further includes a binder and a surfactant.

8. A direct thermal ink as claimed in claim 1 in which said aqueous dispersion comprises from about 10 to 30% by weight of said color developer, from about 6 to 30% by weight of said color former, from about 8 to 20% by weight of said sensitizer, from about 5 to 15% by weight of said binder, from about 0.15 to 0.25% by weight of said surfactant, from about 30 to 45% by weight of a water soluble binder, and the remainder water.

9. A direct thermal ink as claimed in claim 8 in which said binder comprises an acrylic binder.

10. A method of making a printable direct thermal ink comprising the steps of providing a first aqueous dispersion comprising a color developer and a sensitizer and grinding said color developer and sensitizer together to provide a particulate dispersion having an average particle size of less than about 3$\mu$; and providing a second aqueous dispersion of a color former and grinding said color former to provide a particulate dispersion having an average particle size of less than about 3$\mu$; and combining said first and second aqueous dispersions to form said ink, wherein said ink has a solids content of at least about 40% by weight.

11. A method as claimed in claim 10 in which said first aqueous dispersion further includes an acrylic binder and a surfactant.

12. A method as claimed in claim 10 in which said second aqueous dispersion further includes an acrylic binder and a surfactant.

13. A method as claimed in claim 10 in which said grinding of said first aqueous dispersion is carried out at a temperature above the softening point of said sensitizer, and said sensitizer particles crystallize at least partially around said color developer particles.

14. A method as claimed in claim 13 in which said temperature is between about 70 to 100° F.

15. A method as claimed in claim 10 in which said ink is substantially free of pigments and fillers.

16. A method as claimed in claim 10 including the step of adding a water soluble binder to said ink to provide a viscosity of from about 150 to 250 cps.

17. A process for applying a thermal ink to a substrate comprising the steps of:

providing a substrate having first and second surfaces; and applying a thermal ink to at least a portion of one of said first or second surfaces of said substrate, said thermal ink having a solids content of at least 40% by weight and being substantially free of pigments and fillers, said ink comprising an aqueous dispersion of an initially colorless color former and an aqueous dispersion of an initially colorless color developer and a sensitizer which has been ground together with said color developer.

18. The process of claim 17 in which said thermal ink is applied to said substrate by a flexographic printing process.

19. The process of claim 18 in which said thermal ink is applied to said substrate by overprinting a series of half-tone images.

20. The process of claim 17 in which said thermal ink is applied to said substrate to provide a dry coating weight of between about 0.50 and 2.50 lbs/17"×22"×500 sheet ream.

21. The process of claim 18 in which said substrate is selected from the group consisting of paper, synthetic paper, and polymeric film.

22. The process of claim 17 in which said thermal ink has a viscosity of between about 150 to 250 cps.

23. The process of claim 17 in which said aqueous dispersion of said color former is applied to said substrate separately from said aqueous dispersion of said color developer.

24. A thermal ink precursor comprising an aqueous dispersion of a color developer and a sensitizer which has been ground together with said color developer, said precursor having a solids content of from about 40 to 60% by weight and being substantially free of pigments and fillers.

25. A thermal ink precursor comprising an aqueous dispersion of a color former in particulate form which has been ground to a size of less than about 3$\mu$, said ink precursor having a solids content of from about 40 to 60% by weight and being substantially free of pigments and fillers.

* * * * *